US012289585B2

(12) United States Patent
Jiang et al.

(10) Patent No.: US 12,289,585 B2
(45) Date of Patent: Apr. 29, 2025

(54) METHOD AND APPARATUS FOR ELIMINATING SOUND LEAKAGE

(71) Applicant: AAC ACOUSTIC TECHNOLOGIES (SHENZHEN) CO., LTD., Shenzhen (CN)

(72) Inventors: Yuheng Jiang, Shenzhen (CN); Wenkai He, Shenzhen (CN); Kejia Liu, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 241 days.

(21) Appl. No.: 18/088,640

(22) Filed: Dec. 26, 2022

(65) Prior Publication Data

US 2024/0089654 A1 Mar. 14, 2024

Related U.S. Application Data

(63) Continuation of application No. PCT/CN2022/129705, filed on Nov. 4, 2022.

(30) Foreign Application Priority Data

Sep. 9, 2022 (CN) ......................... 202211103556.4

(51) Int. Cl.
*H04R 3/04* (2006.01)

(52) U.S. Cl.
CPC ..................................... *H04R 3/04* (2013.01)

(58) Field of Classification Search
CPC ........ H04R 3/04; H04R 2499/11; H04R 3/12; G10K 11/178
See application file for complete search history.

(56) References Cited

U.S. PATENT DOCUMENTS

2013/0279716 A1* 10/2013 Hartung .................. H04R 3/12 381/80
2023/0171539 A1* 6/2023 Tian ......................... H04R 3/00 381/1

FOREIGN PATENT DOCUMENTS

WO WO-2021238354 A1 * 12/2021 .............. H04M 1/19

* cited by examiner

*Primary Examiner* — Oyesola C Ojo
(74) *Attorney, Agent, or Firm* — Wiersch Law Group

(57) ABSTRACT

The present application relates to a method and apparatus for eliminating sound leakage which includes: determining a first frequency response curve of a first sound wave generated by the call voice at a first position outside a terminal device; controlling a vibration motor to drive a rear housing of the terminal device to vibrate to generate a second sound wave; determining a second frequency response curve of the second sound wave at the first position; and regulating the second frequency response curve to a third frequency response curve, frequency response of the third frequency response curve being superimposed on and canceling frequency response of the first frequency response curve at a corresponding frequency. The vibration motor drives the rear housing to vibrate to actively generate the second sound wave superimposed on and canceling the first sound wave generated by call sound leakage, so as to eliminate leakage of call content.

7 Claims, 5 Drawing Sheets

METHOD AND APPARATUS FOR ELIMINATING SOUND LEAKAGE

TECHNICAL FIELD

The present application relates to the field of terminal devices, and in particular, to a method for eliminating sound leakage and an apparatus for eliminating sound leakage.

BACKGROUND

With the improvement of consumers' privacy awareness, privacy of calls is becoming more and more important to the consumers. During a call, sound may be leaked due to an excessively large power amplifier of a receiver. As a result, users' call content may be leaked. Sound leakage of a terminal device during a call is generally represented by an isolation degree. The better the isolation degree of the terminal device is, the less the sound leakage of the receiver during the call.

During the call, the isolation degree of the call is represented through a difference between sensitivity of the receiver at a human ear and sensitivity of a specific location on the back of the terminal device. The greater the difference between the sensitivity of the two, the better the isolation degree. In the related art, the terminal device improves the isolation degree generally by using a hardware structure, that is, by changing a position of the receiver or a shape of a narrow slit. However, a sound insulation effect is poor, and the sound leakage cannot be completely eliminated.

SUMMARY

In view of the above, embodiments of the present disclosure provide a method for eliminating sound leakage and an apparatus for eliminating sound leakage. A vibration motor mounted on a first device drives a rear housing of a terminal device to vibrate to actively transmit a sound signal with a phase opposite to a phase of a leaking call sound. In this way, a certain degree of cancellation is generated when the leaking call sound is transmitted to others, so as to eliminate the call sound leakage.

In a first aspect, some embodiments of the present disclosure provide a method for eliminating sound leakage, which is applied to a control component. The method includes: controlling, upon detecting that call voice is outputted by a receiver, a collection device to determine a first frequency response curve of a first sound wave generated by the call voice at a first position outside a terminal device; controlling a vibration motor to drive a rear housing of the terminal device to vibrate to generate a second sound wave; determining, by the collection device, a second frequency response curve of the second sound wave at the first position; and regulating, according to the first frequency response curve generated by the second sound wave at the first position, the second frequency response curve to a third frequency response curve, frequency response of the third frequency response curve being superimposed on and canceling frequency response of the first frequency response curve at a corresponding frequency.

As an improvement, the controlling the vibration motor to drive the rear housing of the terminal device to vibrate to generate the second sound wave includes: controlling, upon detecting that the call voice is outputted by the receiver, the vibration motor to vibrate, the vibration of the vibration motor driving the rear housing of the terminal device to vibrate; and generating the second sound wave by an effective vibrating portion arranged on the rear housing of the terminal device when the rear housing of the terminal device is vibrating.

As an improvement, the regulating, according to the first frequency response curve, the second frequency response curve generated by the second sound wave at the first position, to the third frequency response curve includes: performing equalizer, EQ, modulation on the second frequency response curve generated by the second sound wave at the first position, a difference between a frequency response value of the second frequency response curve after the EQ modulation at each frequency and a frequency response value of the first frequency response curve at the frequency being greater than a first threshold that is preset and also being smaller than a second threshold that is preset; regulating an input voltage of the vibration motor to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve.

As an improvement, the second frequency response curve after the EQ modulation has a phase opposite to a phase of the first frequency response curve at each frequency.

As an improvement, the third frequency response curve has a frequency response value corresponding to each frequency, wherein the frequency response value is smaller than a frequency response value of the first frequency response curve corresponding to the frequency, or is smaller than a fourth threshold that is preset.

In a second aspect, some embodiments of the present disclosure provide an apparatus for eliminating sound leakage. The apparatus includes a collection device and a terminal device, and the terminal device includes a vibration motor and a control component. The terminal device is communicated with and connected to the collection device. The vibration motor is configured to drive, under control of the control component, a rear housing of the terminal device to vibrate to generate a second sound wave. The collection device is configured to determine, under control of the control component, a first frequency response curve of a first sound wave at a first position and a second frequency response curve of the second sound wave at the first position, and is configured to transmit the first frequency response curve and the second frequency response curve to the control component of the terminal device. The control component is configured to control, upon detecting that call voice is outputted by a receiver, the vibration motor to drive the rear housing of the terminal device to vibrate to generate the second sound wave, control the collection device to determine the first frequency response curve and the second frequency response curve, and regulate, according to the first frequency response curve, the second frequency response curve generated by the second sound wave at the first position, to a third frequency response curve.

As an improvement, the terminal device further includes an effective vibrating portion. The effective vibrating portion is arranged on the rear housing of the terminal device and is configured to generate the second sound wave when the rear housing of the terminal device is vibrating.

As an improvement, the regulating, according to the first frequency response curve, the second frequency response curve generated by the second sound wave at the first position, to the third frequency response curve includes: performing equalizer, EQ, modulation on the second frequency response curve generated by the second sound wave at the first position, a difference between a frequency response value of the second frequency response curve after the EQ modulation at each frequency and a frequency response value of the first frequency response curve at the frequency being greater than a first threshold that is preset and also being smaller than a second threshold that is preset; regulating an input voltage of the vibration motor to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve.

In a third aspect, some embodiments of the present disclosure provide a device for eliminating sound leakage. The device includes at least one processor, and at least one memory in communication with and connected to the at least one processor. The at least one memory stores program instructions executable by the at least one processor, and when executed by the at least one processor, the program instructions cause the at least one processor to perform a method for eliminating sound leakage. The method includes: controlling, upon detecting that call voice is outputted by a receiver, a collection device to determine a first frequency response curve of a first sound wave generated by the call voice at a first position outside a terminal device; controlling a vibration motor to drive a rear housing of the terminal device to vibrate to generate a second sound wave; determining, by the collection device, a second frequency response curve of the second sound wave at the first position; and regulating, according to the first frequency response curve generated by the second sound wave at the first position, the second frequency response curve to a third frequency response curve, frequency response of the third frequency response curve being superimposed on and canceling frequency response of the first frequency response curve at a corresponding frequency.

As an improvement, the controlling the vibration motor to drive the rear housing of the terminal device to vibrate to generate the second sound wave includes: controlling, upon detecting that the call voice is outputted by the receiver, the vibration motor to vibrate, the vibration of the vibration motor driving the rear housing of the terminal device to vibrate; and generating the second sound wave by an effective vibrating portion arranged on the rear housing of the terminal device when the rear housing of the terminal device is vibrating.

As an improvement, the regulating, according to the first frequency response curve, the second frequency response curve generated by the second sound wave at the first position, to the third frequency response curve includes: performing equalizer, EQ, modulation on the second frequency response curve generated by the second sound wave at the first position, a difference between a frequency response value of the second frequency response curve after the EQ modulation at each frequency and a frequency response value of the first frequency response curve at the frequency being greater than a first threshold that is preset and also being smaller than a second threshold that is preset; regulating an input voltage of the vibration motor to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve.

As an improvement, the second frequency response curve after the EQ modulation has a phase opposite to a phase of the first frequency response curve at each frequency.

As an improvement, the third frequency response curve has a frequency response value corresponding to each frequency, wherein the frequency response value is smaller than a frequency response value of the first frequency response curve corresponding to the frequency, or is smaller than a fourth threshold that is preset.

In a fourth aspect, some embodiments of the present disclosure provide a non-transitory computer-readable storage medium, and the non-transitory computer-readable storage medium includes programs. When the programs are executable, a device including the non-transitory computer-readable storage medium is controlled to perform a method for eliminating sound leakage. The method includes: controlling, upon detecting that call voice is outputted by a receiver, a collection device to determine a first frequency response curve of a first sound wave generated by the call voice at a first position outside a terminal device; controlling a vibration motor to drive a rear housing of the terminal device to vibrate to generate a second sound wave; determining, by the collection device, a second frequency response curve of the second sound wave at the first position; and regulating, according to the first frequency response curve generated by the second sound wave at the first position, the second frequency response curve to a third frequency response curve, frequency response of the third frequency response curve being superimposed on and canceling frequency response of the first frequency response curve at a corresponding frequency.

As an improvement, the controlling the vibration motor to drive the rear housing of the terminal device to vibrate to generate the second sound wave includes: controlling, upon detecting that the call voice is outputted by the receiver, the vibration motor to vibrate, the vibration of the vibration motor driving the rear housing of the terminal device to vibrate; and generating the second sound wave by an effective vibrating portion arranged on the rear housing of the terminal device when the rear housing of the terminal device is vibrating.

As an improvement, the regulating, according to the first frequency response curve, the second frequency response curve generated by the second sound wave at the first position, to the third frequency response curve includes: performing equalizer, EQ, modulation on the second frequency response curve generated by the second sound wave at the first position, a difference between a frequency response value of the second frequency response curve after the EQ modulation at each frequency and a frequency response value of the first frequency response curve at the frequency being greater than a first threshold that is preset and also being smaller than a second threshold that is preset; regulating an input voltage of the vibration motor to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve.

As an improvement, the second frequency response curve after the EQ modulation has a phase opposite to a phase of the first frequency response curve at each frequency.

As an improvement, the third frequency response curve has a frequency response value corresponding to each frequency, wherein the frequency response value is smaller than a frequency response value of the first frequency response curve corresponding to the frequency, or is smaller than a fourth threshold that is preset.

In the above solutions, the vibration motor drives the rear housing of the terminal device to vibrate to actively generate the second sound wave, and the second sound wave is modulated according to a parameter of the first sound wave, so as to ensure that the second sound wave can more effectively eliminate the problem of leakage of call content caused by the first sound wave.

BRIEF DESCRIPTION OF DRAWINGS

In order to more clearly illustrate the technical solutions in the embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings.

DESCRIPTION OF EMBODIMENTS

In order to better understand the technical solution of the present disclosure, the embodiments of the present disclosure are described in detail below with reference to the accompanying drawings.

It should be made clear that the embodiments described are only some rather than all of the embodiments of the present disclosure. All other embodiments acquired by those of ordinary skill in the art based on the embodiments in the present disclosure fall within the protection scope of the present disclosure.

In order to solve the problem of sound leakage of calls, in the embodiments of the present disclosure, a terminal device includes a vibration motor, so that, when a receiver outputs call voice, the vibration motor drives a rear housing of the terminal device to vibrate to actively generate a sound wave which is superimposed on and cancels a sound wave generated by sound leakage of the receiver, so as to achieve an effect of reducing and eliminating the sound leakage of the receiver.

Figure 1:
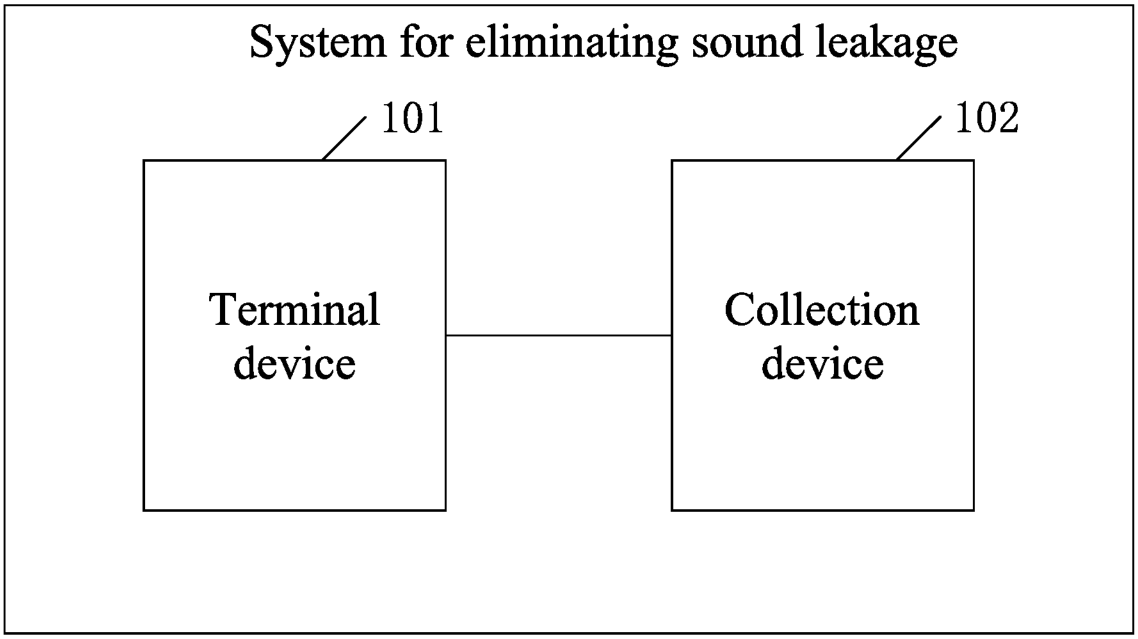
FIG. 1 is a schematic diagram of an apparatus for eliminating sound leakage according to some embodiments of the present disclosure.

In order to eliminate sound leakage of the terminal device, some embodiments of the present disclosure provide an apparatus for eliminating sound leakage. As shown in FIG. 1, the apparatus for eliminating sound leakage includes a terminal device 101 and a collection device 102.

The terminal device 101 is configured to generate a first sound wave and a second sound wave when outputting call voice. The first sound wave is a sound wave that is leaked when a user makes a call. The second sound wave is a sound wave that is actively generated by the terminal device 101 and used for canceling the first sound wave.

The collection device 102 is arranged at a first position outside the terminal device 101 and is communicated with and connected to the terminal device 101. The collection device 102 is configured to, when the terminal device 101 makes a voice call, collect a first frequency response curve of the first sound wave at the first position and a second frequency response curve of the second sound wave at the first position, and is configured to feed the first frequency response curve and the second frequency response curve back to the terminal device 101 through the communication connection with the terminal device 101.

The terminal device 101 modulates the second frequency response curve of the second sound wave into a third frequency response curve according to parameters in the frequency response curves fed back by the collection device 102, that is, modulating the second sound wave into a sound wave that can be superimposed on and cancel the first sound wave, so as to eliminate sound leakage.

Figure 2:
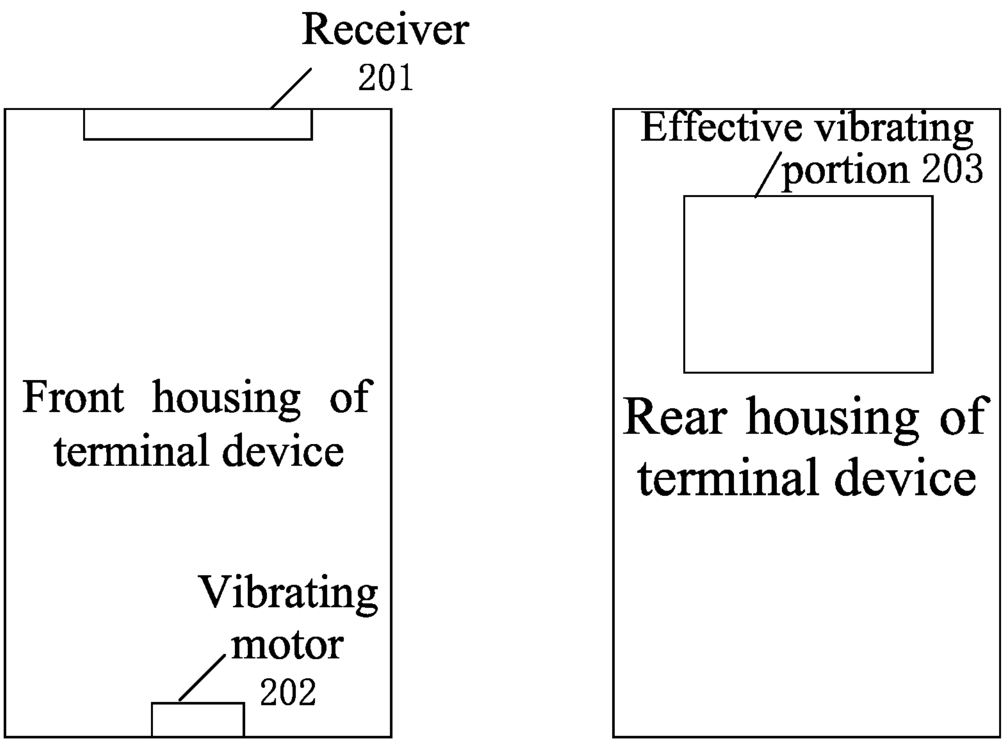
FIG. 2 is a schematic diagram of a terminal device according to some embodiments of the present disclosure.

Referring to FIG. 2 which is a specific schematic diagram of the terminal device 101 in the sound leakage elimination apparatus shown in FIG. 1 according to the present disclosure. As shown in FIG. 2, the terminal device 101 includes a front housing arranged at the front of the terminal device 101, and a receiver 201 is arranged on the top of the front housing. A vibration motor 202 is arranged at the bottom of the front housing. The terminal device includes a rear housing arranged at the back of the terminal device, and an effective vibrating portion 203 is arranged on the rear housing. A control component 204 (not shown in the figure) is arranged inside the terminal device.

In the embodiments of the present disclosure, descriptions are presented based on an example in which the vibration motor 202 is arranged on the front housing. In some embodiments, the vibration motor 202 may also be arranged on the rear housing of the terminal device or at another position of the terminal device, which is not specifically limited herein.

The receiver 201 is configured to play call voice for the user during a call. Since the receiver 201 may leak sound, a first sound wave generated by the call voice may be propagated through a medium to the first position. It is determined that a first frequency response curve of the first sound wave at the first position is determined by the collection device 102, so as to determine a specific parameter of the first sound wave.

The vibration motor 202 is configured to vibrate during the call, so as to generate a second sound wave through the effective vibrating portion 203 of the rear housing of the terminal device.

In some embodiments, the vibration motor 202 vibrates under the control of the control component 204 of the terminal device, and drives the rear housing of the terminal device to vibrate. The rear housing of the terminal device generates the second sound wave through the effective vibrating portion 203 when vibrating.

In some embodiments, the vibration motor 202 with a natural frequency between 100 Hz and 200 Hz is used. A frequency of human voice is about between 500 Hz and 2000 Hz. Therefore, vibration sensation of the vibration motor 202 is weak in the frequency range, and additional vibration generated during the vibration can be ignored, which may not affect the user's call.

The number of the vibration motor 202 is not specifically limited in this embodiment of the present disclosure. The terminal device 101 according to some embodiment of the present disclosure may be provided with one or more vibration motor.

The effective vibrating portion 203 is configured to generate the second sound wave according to the vibration of the rear housing of the terminal device.

During the call, the user's ear is closer to the receiver 201, but far from the rear housing of the terminal device. Therefore, it may be regarded that the second sound wave generated by the rear housing has a smaller influence on frequency response of the ear, but greatly influences on locations of others in a surrounding environment. Thus, the effective vibrating portion configured to generate the second sound wave is arranged at the rear housing of the terminal device.

During the call, the user mostly holds a lower half part of the terminal device 101. Therefore, the arrangement where the effective vibrating portion 203 on an upper half part of the rear housing of the terminal device enables the second sound wave to be better propagated.

The control component 204 is configured to regulate, according to the first frequency response curve, the second frequency response curve generated by the second sound wave at the first position to a third frequency response curve.

In some embodiments, when detecting that the terminal device is outputting call voice, the control component 204 instructs the vibration motor 202 to start vibrating to generate the second sound wave. Then the control component 204 transmits a collection instruction to the collection device 102 to instruct the collection device 102 to collect the first frequency response curve of the first sound wave and the second frequency response curve of the second sound wave, and the first frequency response curve and the second frequency response curve are then feed to the control component 204 of the terminal device 101.

After the first frequency response curve and the second frequency response curve that are fed back by the collection device 102 are received, the second frequency response curve of the second sound wave is modulated according to the first frequency response curve until the second frequency response curve is modulated to a third frequency response curve that meets a parameter requirement of the first frequency response curve.

Figure 3:
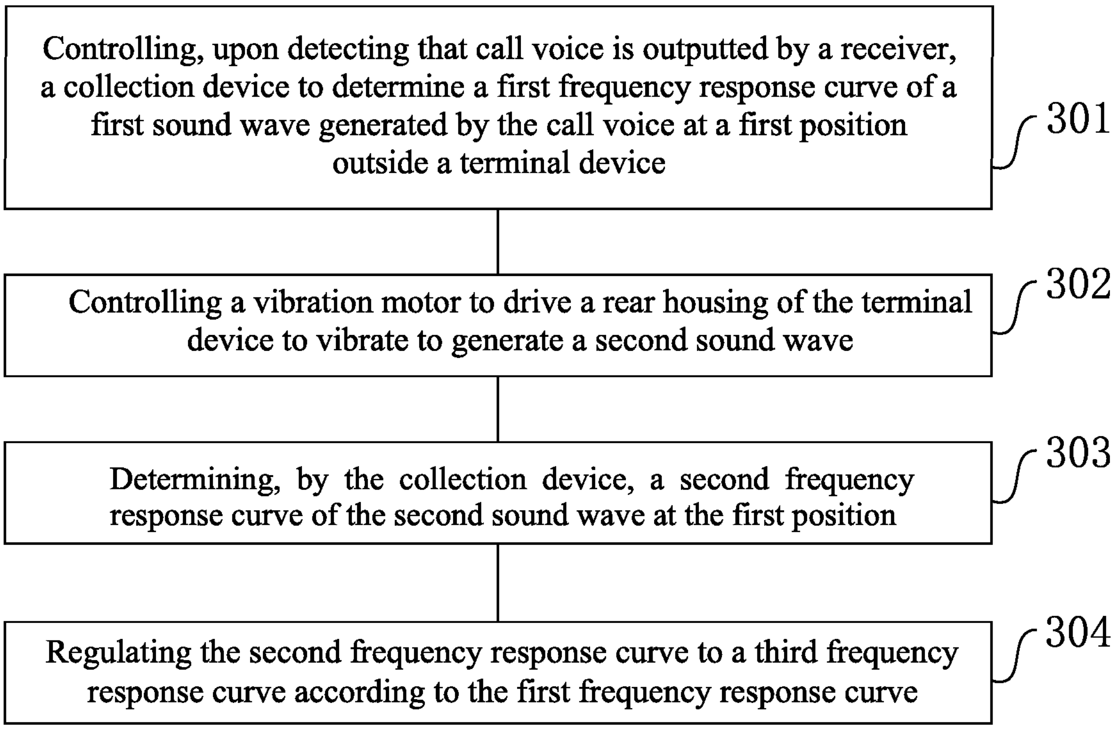
FIG. 3 is a flow chart of a method for eliminating sound leakage according to some embodiments of the present disclosure.

In conjunction with the apparatus for eliminating sound leakage shown in FIG. 1 and the terminal device shown in FIG. 2, some embodiments of the present disclosure further provide a method for eliminating sound leakage. The method is applied to the control component in the terminal device. As shown in FIG. 3, the method includes the steps 301, 302, 303, and 304.

At step 301, upon detecting that call voice is outputted by a receiver, a collection device determines a first frequency response curve of a first sound wave generated by the call voice at a first position outside a terminal device.

When the first sound wave generated by the call voice outputted by the receiver is transmitted to the first position, the first frequency response curve of the first sound wave is determined by the collection device arranged at the first position. In some embodiments, the collection device may be a microphone.

The first frequency response curve is a curve representing a corresponding relationship between frequencies and frequency response of the first sound wave at the first position.

At step 302, a vibration motor drives a rear housing of the terminal device to vibrate to generate a second sound wave.

When it is detected that the receiver is outputting call voice, that is, the user is making a voice call with a peer end through the terminal device, the vibration motor is actively controlled to vibrate to generate the second sound wave for canceling the first sound wave.

The vibration motor drives the rear housing of the terminal device to vibrate when vibrating. The rear housing of the terminal device generates the second sound wave through an effective vibrating portion deployed.

At step 303, a second frequency response curve of the second sound wave at the first position is determined by the collection device.

When the second sound wave generated by the vibration motor is transmitted to the first position, the second frequency response curve of the second sound wave is determined by the collection device arranged at the first position. The second frequency response curve is used to determine frequency response values corresponding to the second sound wave at different frequencies at the first position.

At step 304, the second frequency response curve generated by the second sound wave at the first position is regulated to the third frequency response curve according to the first frequency response curve.

The second sound wave is modulated and the vibration motor generating the second sound wave is regulated to regulate the second frequency response curve of the second sound wave at the first position to the third frequency response curve. Frequency response values of the third frequency response curve at various frequencies are almost identical with frequency response values of the first frequency response curve at the corresponding frequencies, and phases of the frequency response of the third frequency response curve at various frequencies are opposite to the phases of the frequency response of the first frequency response curve at the corresponding frequencies, so that the second sound wave can be effectively superimposed on and cancel the first sound wave.

Firstly, an equalizer (EQ) modulation is performed on the second frequency response curve of the second sound wave at the first position to regulate the second frequency response curve to a frequency response curve with a same trend as the first frequency response curve.

With the EQ modulation, frequency response values at various frequencies in the second frequency response curve is regulated, so that a difference between the frequency response value in the second frequency response curve at any frequency and the frequency response value in the first frequency response curve at the frequency is greater than a first threshold and smaller than a second threshold. That is, the difference between the first frequency response curve and the second frequency response curve at any frequency is within a fixed range.

Figure 4:
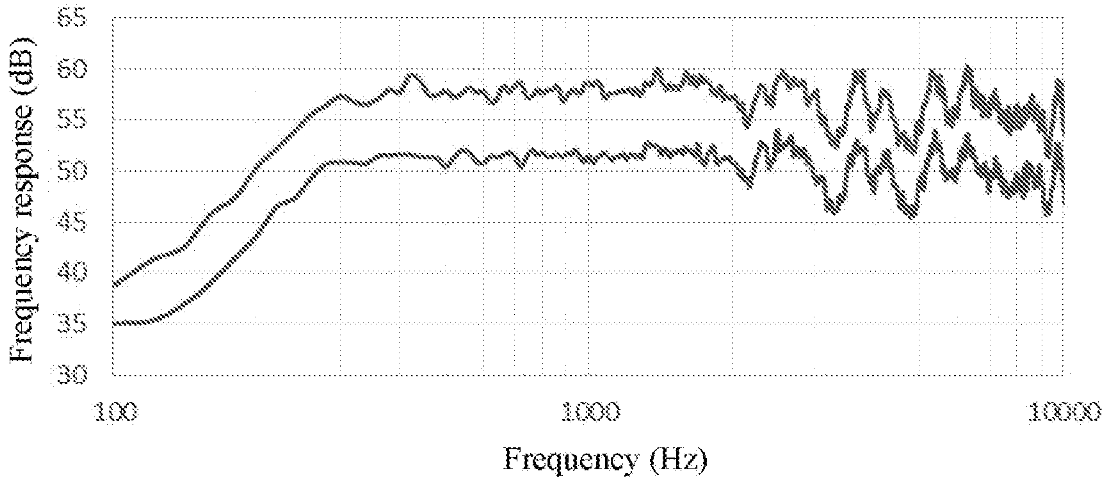
FIG. 4 shows an image of a frequency response curve according to some embodiments of the present disclosure.

FIG. 4 is a schematic diagram of a frequency response curve according to some embodiments of the present disclosure. Referring to FIG. 4, the second frequency response curve after the EQ modulation has a same trend as the first frequency response curve. That is, the difference between corresponding frequency response value at each frequency is within a fixed range. In some embodiments, the first frequency response curve and the second frequency response curve have a same shape.

After performing EQ modulation on the second frequency response curve, an input voltage of the vibration motor can be regulated to obtain another second frequency response curve, where the another second frequency response curve is obtained by setting a frequency response value of the second frequency response curve after the EQ modulation at each frequency so that a difference between the frequency response value and a frequency response value of the first frequency response curve at the frequency is smaller than a third threshold. That is, the frequency response value of the second frequency response curve at any frequency approaches the frequency response value of the first frequency response curve at the frequency.

The another second frequency response is determined as the third frequency response curve. A parameter of the second sound wave reflected in the third frequency response curve is almost identical with the parameter of the first sound wave, which have opposite phases, so that the first sound wave can be effectively eliminated.

In this embodiment of the present disclosure, the vibration motor drives the rear housing of the terminal device to vibrate to actively generate the second sound wave, and the second sound wave is modulated according to the parameter of the first sound wave, so as to ensure that the second sound wave can more effectively eliminate the problem of leakage of call content caused by the first sound wave.

In some embodiments, in order to ensure that the second sound wave can cancel the first sound wave instead of increasing the first sound wave in reverse, it can be ensured that the frequency response values in the third frequency response curve satisfy a preset condition all the time during the modulation of the second sound wave.

In some embodiments, the frequency response value corresponding to the third frequency response curve at any frequency is smaller than the frequency response value corresponding to the first frequency response curve at the frequency.

A cancellation effect can be generated at the corresponding frequency only when the frequency response value in the third frequency response curve is smaller than the frequency response value in the first frequency response curve. However, once the frequency response value in the third frequency response curve is greater than the frequency response value in the first frequency response curve, the first sound wave may be enhanced in reverse.

In some embodiments, a fourth threshold may also be preset, and the frequency response value in the third frequency response curve is kept smaller than the fourth threshold. Under frequency response values specified by the fourth threshold, even if the second sound wave slightly enhances the first sound wave, others cannot hear the call content. In this case, it may also be considered that the sound leakage elimination method takes effect. Generally, the fourth threshold is set to 20 dB.

In some embodiments, several different first positions may be pre-selected, first frequency response curves of the first sound wave at the first positions are measured respectively, and parameters of the second sound wave corresponding thereto are determined. The parameters of the second sound wave for eliminating sound leakage at the different first positions are stored respectively. When the terminal device makes an actual call, the pre-stored parameters may be directly called to modulate the second sound wave, without performing collection and calculation again through the collection device.

Figure 5:
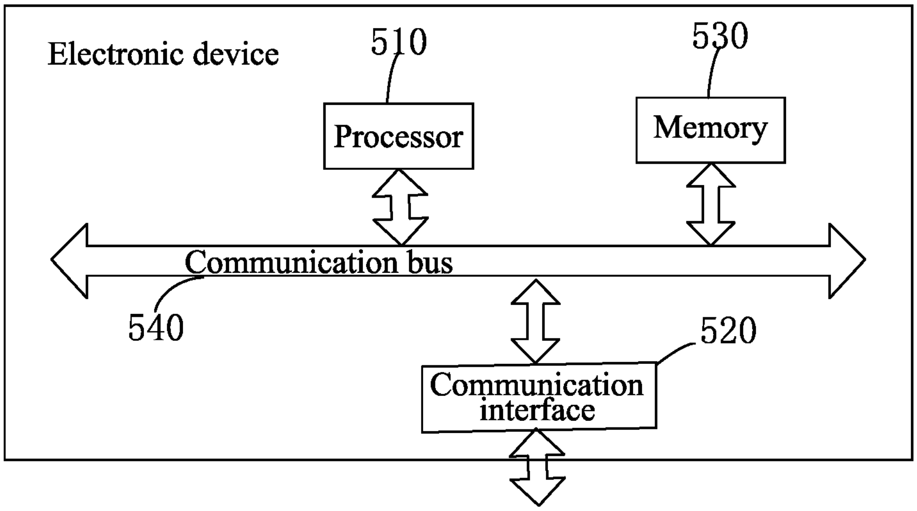
FIG. 5 is a schematic diagram of an electronic device according to some embodiments of the present disclosure.

FIG. 5 is a schematic diagram of an electronic device according to some embodiments of the present disclosure. The electronic device may be a terminal device in the apparatus for eliminating sound leakage according to the embodiments of the present disclosure. As shown in FIG. 5, the electronic device may include at least one processor, and at least one memory in communication connection with the processor. The memory stores program instructions executable by the processor, and when executed by the processor, the program instructions cause the processor to perform the method for eliminating sound leakage according to the above embodiments.

The electronic device may be a device that can make an intelligent conversation with a user. The specific form of the electronic device is not limited in the embodiments of the specification. It may be understood that the electronic device herein is the machine mentioned in the method embodiment.

FIG. 5 is a block diagram of an example electronic device suitable for implementing the embodiments of the specification. The electronic device shown in FIG. 5 is only an example, which should not limit the function and application scope of the embodiments of the specification.

As shown in FIG. 5, the electronic device is represented in the form of a general computing device. Components of the electronic device may include, but are not limited to, at least one processor 510, a communication interface 520, a memory 530, and a communication bus 540 connecting different system components (including the memory 530, the communication interface 520, and the processor 510).

The communication bus 540 represents one or more of several types of bus structures, including a memory bus or memory controller, a peripheral bus, an accelerated graphics port, and a processor or a local bus using any of a variety of bus structures. For example, such architectures include, but are not limited to, an industry standard architecture (ISA) bus, a micro channel architecture (MCA) bus, an enhanced ISA (EISA) bus, a video electronics standards association (VESA) local bus, and a peripheral component interconnection (PCI) bus.

The electronic device can include a variety of computer system readable media. Such media may be any available media that is accessible by the electronic device, including volatile media and non-volatile media and movable and non-movable media.

The memory 530 may include computer system readable media in the form of a volatile memory, such as a random access memory (RAM) and/or a cache memory. The electronic device may include other movable/non-movable, volatile/non-volatile computer system storage media. The memory 530 may include at least one program product. The program product has a set (e.g., at least one) of program modules. The program modules are configured to perform the functions of the embodiments in the specification.

Program/utility, having a set (at least one) of program modules, may be stored in the memory 530. Such program modules include, but are not limited to, an operating system, one or more application programs, other program modules, and program data. Each of the examples or a combination thereof may include an implementation of a network environment. The program modules generally perform the functions and/or methods in the embodiments described in the specification.

The program stored in the memory 530 is performed by the processor 510 so as to execute various functional applications and data processing, for example, implement the method for eliminating sound leakage according to the embodiments in the specification.

An embodiment of the specification provides a non-transitory computer-readable storage medium. The non-transitory computer-readable storage medium stores computer instructions. The computer instructions cause the computer to perform the method for eliminating sound leakage according to the embodiments in the specification.

The non-transitory computer-readable storage medium may be any combination of one or more computer-readable mediums. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium include: an electrical connection having one or more wires, a portable computer diskette, a hard disk, a random access memory (RAM), a read only memory (ROM), an erasable programmable read-only memory (EPROM) or a flash memory, an optical fiber, a portable compact disc read only memory (CD-ROM), an optical storage device, a magnetic storage device, or any suitable combination of the foregoing. In the text herein, the computer-readable storage medium may be any tangible medium that can include or store a program. The program may be used by or in conjunction with an instruction execution system, apparatus, or device.

The computer-readable signal medium may include a data signal propagated in a baseband or as part of a carrier wave, in which computer-readable program code is carried. The data signal propagated in this manner may take a variety of forms, including, but not limited to, an electromagnetic signal, an optical signal, or any suitable combination thereof. The computer-readable signal medium may also be any computer-readable medium other than the computer-readable storage medium. The computer-readable medium can send, propagate, or transmit a program for use by or in conjunction with an instruction execution system, apparatus, or device.

The program code embodied on the computer-readable medium may be transmitted using any appropriate medium, including but not limited to, radio, electric wire, optical cable, radio frequency (RF) or the like, or any suitable combination thereof.

Computer program code for performing operations in the specification may be written in one or more programming languages or any combination thereof. The programming languages include an object oriented programming language such as Java, Smalltalk, C++ or the like, and further include conventional procedural programming languages, such as the “C” programming language or similar programming languages. The program code may be executed entirely on a user computer, partly on the user computer, as a stand-alone software package, partly on the user computer and partly on a remote computer, or entirely on the remote computer or a server. In the situation where the remote computer is involved, the remote computer may be connected to the user computer through any type of network, including a local area network (LAN) or a wide area network (WAN), or connected to an external computer (for example, through the Internet by using an Internet service provider).

Particular embodiments of the specification are described above. Other embodiments fall within the scope of the appended claims. In some situations, the actions or steps described in the claims can be performed in a sequence different from the sequence in the embodiment and the desired results can still be achieved. In addition, the process depicted in the accompanying drawings does not necessarily require a particular order or sequential order to achieve the desired results. In some embodiments, multi-tasking and parallel processing are also possible or may be advantageous.

In addition, the terms “first” and “second” are used for descriptive purposes only, which cannot be construed as indicating or implying a relative importance, or implicitly specifying the number of the indicated technical features. Thus, the features defined with “first” and “second” may explicitly or implicitly include one or more features. In the description of the specification, “a plurality of” means two or more, for example, two, three, or the like, unless specifically stated otherwise.

The description of any process or method in the flowcharts or described herein in other manners may be understood as representing a module, a segment or a part that includes one or more codes of executable instructions for implementing the steps of a customized logic function or process, and the scope of preferred embodiments of the specification include other implementations. The functions may be executed in a basically simultaneous manner or an opposite order according to the related functions instead of the shown or described order. This should be understood by those skilled in the art to which the embodiments of the specification belong.

Depending on the context, the wording “if” used herein may be interpreted as “when”, or “once”, or “in response to a determination” or “in response to detection”. Similarly, depending on the context, the phrase “if it is determined that” or “if (a described condition or event) is detected” may be interpreted as “once it is determined that”, or “in response to a determination”, or “once (a described condition or event) is detected”, or “in response to a case where (a described condition or event) is detected”.

The terminal referred to in the embodiments of the specification may include, but is not limited to, a personal computer (PC), a personal digital assistant (PDA), a wireless hand-held device, a tablet computer, a mobile phone, an MP3 player, an MP4 player, and the like.

In the embodiments provided in the specification, it should be understood that the disclosed system, apparatus, and method may be implemented in other manners. For example, the described apparatus embodiment is merely an example. For example, the division of units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the specification may be integrated into one processing unit, or each of the units may exist alone physically, or two or more units are integrated into one unit. The integrated unit may be implemented in a form of hardware or in a form of hardware plus a software function unit.

The integrated unit implemented in the form of the software function unit may be stored in a computer-readable storage medium. The software function unit is stored in a storage medium, and includes several instructions for instructing a computer device (which may be a personal computer, a server, a network device, or the like) or a processor to perform all or some of the steps of the methods described in the embodiments of the specification.

The foregoing descriptions are merely some embodiments of the specification, but are not intended to limit the specification. Any modification, equivalent replacement, improvement, and the like made within the principle of the specification shall fall within the protection scope of the specification.

What is claimed is:

1. A method for eliminating sound leakage, applied to a control component and comprising:

controlling, upon detecting that call voice is outputted by a receiver, a collection device to determine a first frequency response curve of a first sound wave generated by the call voice at a first position outside a terminal device;

controlling a vibration motor to drive a rear housing of the terminal device to vibrate to generate a second sound wave;

determining, by the collection device, a second frequency response curve of the second sound wave at the first position; and regulating, according to the first frequency response curve, the second frequency response curve generated by the second sound wave at the first position, to determine it to a third frequency response curve, frequency response of the third frequency response curve being superimposed on and canceling frequency response of the first frequency response curve at a corresponding frequency;

wherein the controlling the vibration motor to drive the rear housing of the terminal device to vibrate to generate the second sound wave comprises:

controlling, upon detecting that the call voice is outputted by the receiver, the vibration motor to vibrate, the vibration of the vibration motor driving the rear housing of the terminal device to vibrate; and generating the second sound wave by an effective vibrating portion arranged on the rear housing of the terminal device when the rear housing of the terminal device is vibrating;

wherein the regulating, according to the first frequency response curve, the second frequency response curve generated by the second sound wave at the first position, to the third frequency response curve comprises:

performing equalizer, EQ, modulation on the second frequency response curve generated by the second sound wave at the first position, a difference between a frequency response value of the second frequency response curve after the EQ modulation at each frequency and a frequency response value of the first frequency response curve at the frequency being greater than a first threshold that is preset and also being smaller than a second threshold that is preset;

regulating an input voltage of the vibration motor to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve as the third frequency response curve.

2. The method as described in claim 1, wherein the second frequency response curve after the EQ modulation has a phase opposite to a phase of the first frequency response curve at each frequency.

3. The method as described in claim 1, wherein the third frequency response curve has a frequency response value corresponding to each frequency, wherein the frequency response value is smaller than a frequency response value of the first frequency response curve corresponding to the frequency, or is smaller than a fourth threshold that is preset.

4. An apparatus for eliminating sound leakage, comprising:

a collection device; and a terminal device, the terminal device comprising a vibration motor and a control component and being communicated with and connected to the collection device, wherein the vibration motor is configured to drive, under control of the control component, a rear housing of the terminal device to vibrate to generate a second sound wave;

wherein the collection device is configured to determine, under control of the control component, a first frequency response curve of a first sound wave at a first position and a second frequency response curve of the second sound wave at the first position, and is further configured to transmit the first frequency response curve and the second frequency response curve to the control component of the terminal device; and wherein the control component is configured to control, upon detecting that call voice is outputted by a receiver, the vibration motor to drive the rear housing of the terminal device to vibrate to generate the second sound wave; control the collection device to determine the first frequency response curve and the second frequency response curve; and regulate, according to the first frequency response curve, the second frequency response curve generated by the second sound wave at the first position, to determine it to a third frequency response curve;

wherein the terminal device further comprises an effective vibrating portion, wherein the effective vibrating portion is arranged on the rear housing of the terminal device and is configured to generate the second sound wave when the rear housing of the terminal device is vibrating, wherein the regulating, according to the first frequency response curve, the second frequency response curve generated by the second sound wave at the first position, to the third frequency response curve comprises:

performing equalizer, EQ, modulation on the second frequency response curve generated by the second sound wave at the first position, a difference between a frequency response value of the second frequency response curve after the EQ modulation at each frequency and a frequency response value of the first frequency response curve at the frequency being greater than a first threshold that is preset and also being smaller than a second threshold that is preset;

regulating an input voltage of the vibration motor to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve as the third frequency response curve.

5. A device for eliminating sound leakage, comprising:

at least one processor; and at least one memory in communication with and connected to the at least one processor, wherein the at least one memory stores program instructions executable by the at least one processor, and when executed by the at least one processor, the program instructions cause the at least one processor to perform a method for eliminating sound leakage; and wherein the method for eliminating sound leakage comprises:

controlling, upon detecting that call voice is outputted by a receiver, a collection device to determine a first frequency response curve of a first sound wave generated by the call voice at a first position outside a terminal device;

controlling a vibration motor to drive a rear housing of the terminal device to vibrate to generate a second sound wave;

determining, by the collection device, a second frequency response curve of the second sound wave at the first position; and regulating, according to the first frequency response curve, the second frequency response curve generated by the second sound wave at the first position, to determine it to a third frequency response curve, frequency response of the third frequency response curve being superimposed on and canceling frequency response of the first frequency response curve at a corresponding frequency;

wherein the controlling the vibration motor to drive the rear housing of the terminal device to vibrate to generate the second sound wave comprises:

controlling, upon detecting that the call voice is outputted by the receiver, the vibration motor to vibrate, the vibration of the vibration motor driving the rear housing of the terminal device to vibrate; and generating the second sound wave by an effective vibrating portion arranged on the rear housing of the terminal device when the rear housing of the terminal device is vibrating;

wherein the regulating, according to the first frequency response curve, the second frequency response curve generated by the second sound wave at the first position, to the third frequency response curve comprises:

performing equalizer, EQ, modulation on the second frequency response curve generated by the second sound wave at the first position, a difference between a frequency response value of the second frequency response curve after the EQ modulation at each frequency and a frequency response value of the first frequency response curve at the frequency being greater than a first threshold that is preset and also being smaller than a second threshold that is preset;

regulating an input voltage of the vibration motor to obtain another second frequency response curve, wherein the another second frequency response curve is obtained by setting a frequency response value of the second frequency response curve after the EQ modulation at each frequency so that a difference between the frequency response value and a frequency response value of the first frequency response curve at the frequency is smaller than a third threshold that is preset; and determining the another second frequency response curve as the third frequency response curve.

6. The device as described in claim 5, wherein the second frequency response curve after the EQ modulation has a phase opposite to a phase of the first frequency response curve at each frequency.

7. The device as described in claim 5, wherein the third frequency response curve has a frequency response value corresponding to each frequency, wherein the frequency response value is smaller than a frequency response value of the first frequency response curve corresponding to the frequency, or is smaller than a fourth threshold that is preset.

* * * * *